United States Patent [19]

Palmer

[11] 4,431,260
[45] Feb. 14, 1984

[54] METHOD OF FABRICATION OF FIBER OPTIC COUPLER

[75] Inventor: John P. Palmer, Pomona, Calif.

[73] Assignee: General Dynamics, Pomona Division, Pomona, Calif.

[21] Appl. No.: 227,712

[22] Filed: Jan. 23, 1981

Related U.S. Application Data

[63] Continuation of Ser. No. 15,026, Feb. 26, 1979, abandoned.

[51] Int. Cl.³ .............................................. G02B 7/26
[52] U.S. Cl. .................................................. 350/96.15
[58] Field of Search .......................... 350/96.15, 96.16

[56] References Cited

U.S. PATENT DOCUMENTS

| | | | |
|---|---|---|---|
| 3,406,358 | 10/1968 | Seidel et al. | 350/96.15 X |
| 3,508,589 | 4/1970 | Derick et al. | 139/420 |
| 3,933,410 | 1/1976 | Milton | 350/96.16 |
| 3,982,123 | 9/1976 | Goell et al. | 350/96.15 X |
| 4,021,097 | 5/1977 | McMahon | 350/96.15 |
| 4,026,632 | 5/1977 | Hill et al. | 350/96.15 |
| 4,087,156 | 5/1978 | Kao et al. | 350/96.15 |
| 4,136,929 | 1/1979 | Suzaki | 350/96.15 |

FOREIGN PATENT DOCUMENTS 52-24539 2/1977 Japan .............................. 350/96.15

OTHER PUBLICATIONS

Fujita et al., *Applied Optics*, vol. 15, p. 2031, Sep. 1976, "Optical Fiber Wave Splitting Coupler".
Susuki et al., *Applied Optics*, vol. 15, p. 2032, Sep. 1976, "Concentrated-Type Directional Coupler for Optical Fibers".
Minemura et al., *Electronics Letters*, vol. 14, p. 340, May 25, 1978, "Two-Way Transmission Experiments Over a Single Optical Fiber . . . ".
Drake, *Applied Optics*, vol. 17, p. 3248, Oct. 15, 1978, "Multimode Fiber-Optic Coupler with Low Insertion Loss".
Kawasaki et al *Applied Optics*, vol. 16, p. 1794, Jul. 1977, "Low-Loss Access Coupler for Multimode Optical Fiber . . . ".
Barnoski et al., EASCON-76 Conference Proceedings, p. 119A, 1976, "Components for Single-Strand Fiber Systems".
Tsujimoto et al., *Electronics Letters*, vol. 14, No. 5, Mar. 2, 1978, pp. 157-158 " . . . with Multimode Optical Fibers".
Barnoski et al., *Applied Optics*, vol. 15, No. 11, Nov. 1976, "Fabrication of an Access Coupler with Multimode Fiber . . . ".

*Primary Examiner*—John D. Lee
*Assistant Examiner*—Frank González
*Attorney, Agent, or Firm*—Henry M. Bissell; Edward B. Johnson

[57] ABSTRACT

A low-loss bidirectional optical coupler is provided by mounting together and joining with epoxy resin two like fiber optic elements in face-to-face relationship along a common plane. Each of the elements is fabricated by affixing a portion of an optical fiber with epoxy resin along the curved surface of a solid support form. After the epoxy securing the fiber to the form is cured and hardened, a planar surface extending partially into and along the fiber is established by lapping and polishing the element to a carefully controlled depth. The techniques employed and the resulting devices permit coupling between pairs of individual fibers joined in the manner described.

6 Claims, 9 Drawing Figures

METHOD OF FABRICATION OF FIBER OPTIC COUPLER

This is a continuation, of application Ser. No. 015,026, filed Feb. 26, 1979, now abandoned.

CROSS-REFERENCE TO RELATED APPLICATION

This application discloses structure which is similar to devices disclosed in my application Ser. No. 015,027, filed Feb. 26, 1979, entitled FIBER OPTIC TAP AND METHOD OF FABRICATION, now abandoned, continuing application Ser. No. 227,756, filed Jan. 23, 1981.

BACKGROUND OF THE INVENTION

1. Field of the Invention

This invention relates to fiber optic transmission lines and, more particularly, to devices for coupling light energy between pairs of individual optical fibers.

2. Description of the Prior Art

The field of fiber optics has progressed in a relatively few years from laboratory curiosities and decorative pieces to present-day systems of high sophistication for optical communication and data transmission. Optical fibers—so-called "light pipes"—are specially fabricated filaments which exhibit the property of transmitting light longitudinally along a flexible axis. Various materials which are used in the fabrication of optical fibers and the particular properties thereof are described for example in the Derick et al U.S. Pat. No. 3,508,589 and in further detail in British Pat. No. 1,037,498, cited therein.

Low-loss optical couplers are important components for fiber optic distribution networks. Since networks having a large number of branching couplers are inherently powerstarved, it is important to minimize excess losses associated with these components. Furthermore, it is desirable to have couplers for which the coupling ratio can be tailored conveniently to the unique requirements of a particular system.

Several different types of couplers for multimode fibers have been reported in the prior art. A "Y" coupler can be formed by fusing the ends of three fibers; see Fujita et al, "Optical Fiber Wave Splitting Coupler", *Applied Optics*, Vol. 15, page 2031 (September, 1976). However, it appears that this process is difficult to control and that the resulting device is very fragile. Suzuki et al, "Concentrated-Type Directional Coupler for Optical Fibers", *Applied Optics*, Vol. 15, page 2032 (September, 1976) report a coupler utilizing a pair of face-to-face microprisms.

A second type of coupler has been fabricated using graded index lenses; see Minemura et al, "Two-Way Transmission Experiments Over a Single Optical Fibre at the Same Wavelength Using Micro-Optic 3 dB Couplers", *Electronics Letters*, Vol. 14, page 340 (May 25, 1978). The efficiency of this and the previously mentioned couplers is very dependent on the optical wavelength and the coupling ratio is variable only at a sacrifice of coupling efficiency.

Another type of coupler consists of parallel optical fibers having relatively thin optical cladding; see Drake, "Multimode Fiber-Optic Coupler with Low Insertion Loss", *Applied Optics*, Vol. 17, page 3248 (Oct. 15, 1978). Light is coupled between fibers by resonant energy exchange. The principal disadvantage of this coupler is that the coupling length required for an adequate coupling ratio in most applications is quite long (several centimeters).

One technique for reducing the necessary interaction length is to thermally fuse the parallel fibers, as disclosed in Kawasaki et al, "Low-Loss Access Coupler for Multimode Optical Fibre Distribution Networks", *Applied Optics*, Vol. 16, page 1794 (July, 1977) and Barnoski et al, "Components for Single-Strand Fiber Systems", *EASCON-76 Conference Proceedings*, page 119A (1976). The interaction length may be reduced to 1 cm. However, the devices are very fragile and the fabrication process is difficult to control. It is considered difficult to achieve repeatable results in different devices of this type.

An alternative means for reducing coupling length for parallel fibers is to lap polished optical flats on the sides of two fibers which are bent and fixed in pillar-shaped plastic blocks, contacting with matching oil applied at the interface of the two fibers as described in Tsujimoto et al, "Fabrication of Low-Loss 3 dB Couplers with Multimode Optical Fibers", *Electronics Letters*, Vol. 14, page 157 Mar. 2, 1978).

U.S. Pat. Nos. 3,933,410 of Milton and 4,087,156 of Kao et al describe special inserts or sections for a fiber bundle transmission line for coupling or mixing between pluralities of fibers. The McMahon U.S. Pat. No. 4,021,097 describes an optical coupling apparatus for coupling between a bundle or ribbon of side-by-side fibers and a specially shaped slab waveguide. This slab waveguide is extremely thin (comparable to the thickness of the optical fibers) and therefore is difficult to fabricate and is very fragile.

It has been demonstrated that when an optical fiber is bent in the form of an arc, there is an increased tendency for light to escape from the bent region in a radiation pattern which is primarily in the plane of the bend and which is directed away from the center of curvature. See for example Gambling et al, "Radiation From Curved Single-Mode Fibres", *Electronics Letters*, Vol. 12, page 567 (Oct. 14, 1976) and Goell et al U.S. Pat. No. 3,982,123. This effect is reciprocal, in that a greater proportion of light incident upon a fiber is coupled into the optical waveguide when the fiber is curved as compared with a straight fiber (provided the direction of incident light is consistent with the fiber orientation). Consequently, two fibers bent on a radius of curvature can be positioned such that light radiating from one fiber is coupled into the adjacent fiber with a high degree of efficiency. The degree of coupling is enhanced when the fiber cores are brought even closer together, as when optical flats are lapped and polished on the two fibers at the location where they are joined.

SUMMARY OF THE INVENTION

In brief, fiber optic couplers in accordance with the present invention involve the use of solid forms to support and bend the respective optical fibers between which light energy is to be coupled. Each form is machined from a solid material such as aluminum to develop one curved side having a circular arc with a radius of curvature between 5 and 8 cm, preferably 6 cm. A coating of epoxy resin is placed on the curved surface of each form and a fiber is placed in the epoxy and constrained to the curvature of the form. After the epoxy has been cured, the forms are mounted on a lapping and polishing fixture. The loose fiber ends are secured to the fixture to prevent breakage of the fibers. A flat surface is lapped on the epoxy, and eventually a small region of the glass fiber, embedded in the epoxy, become exposed. Lapping of a flat surface on the fiber (and epoxy) continues until sufficient material has been removed. The depth of glass removal is monitored by measuring the length and width of the flat region lapped on the fiber. This measurement is made using a microscope with a micrometeractuated X-Y stage. The depth of fiber removed is controlled routinely to an accuracy of ±10 micrometers, preferably to an accuracy of ±2 micrometers. Then the lapped surfaces are polished using the same supporting fixture on the second machine which uses a fine (¼-micron) polishing compound. The depth of the resulting planar surface relative to the fiber core axis is controlled in accordance with the invention according to the parameters desired for a given coupler and optical transmission system. Lapping and polishing in the manner described results in the flat surface of the fiber being slightly in relief relative to the plane of the epoxy. This is because the epoxy is softer than the glass core and therefore laps faster. The existence of the fiber flats in relief is utilized in the assembly and alignment of the blocks to form the coupler, since the operator can detect the physical alignment of the fibers (to a rough or coarse initial approximation) by "feeling" the contact between the raised fiber flats.

The coupler is assembled by cementing two identical parts together, using optically transparent epoxy. After the initial coarse alignment as described, the components are finally and precisely aligned by focusing light from a helium-neon laser into one of the four fiber ends and observing the intensity of light coupled into the opposite fiber (out of the associated end of that fiber). This coupled light intensity is monitored with a photodiode and appropriate electronic apparatus. The transparent epoxy cement is then cured so that the coupler assembly presents a rigid structure. Thereafter the assembly may be mounted in a suitable package, such as an aluminum chassis or molded enclosure, either of which supports four optical connectors required to interface the device.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Figure 1:
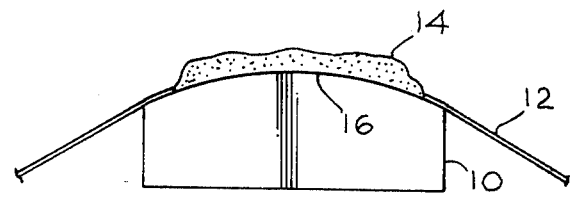
FIG. 1 is a view of a portion of a preferred embodiment of the invention in a preliminary state of fabrication.
Figure 2:
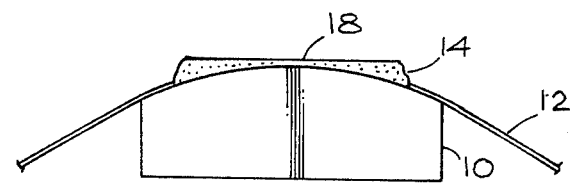
FIG. 2 is a view of the portion of FIG. 1, following a succeeding step in the fabrication process.

FIG. 1 illustrates a form 10 to which an optical fiber 12 is affixed by cured and hardened epoxy resin 14. The form 10 is machined from solid material, such as aluminum, to develop a curved side 16 with a circular arc having a radius of curvature between 5 and 8 cm, preferably of 6 cm. Sufficient epoxy is applied to result in an adequate support surface when the part is lapped, as shown in FIG. 2. After the epoxy 14 has been cured, the form 10 with fiber 12 attached, together with a plurality of other forms and fibers which have been similarly prepared, is mounted on a lapping and polishing fixture (not shown). In this step, the loose ends of the fibers 12 are secured to the fixture to prevent breakage. A flat surface 18 is lapped into the epoxy 14, as shown in FIG. 2. During lapping in this fashion, a small region 18' of the fiber 12 becomes exposed and lapping of the flat surface 18 continues into the fiber 12 and epoxy 14 until the predetermined amount of fiber has been removed. Lapping as described develops a fiber flat 18' which is raised very slightly above the epoxy planar surface 18, since the epoxy is softer and laps faster than the glass (see FIG. 4). The depth of penetration of the fiber core is monitored by measuring the length and width of the portion 18' of the surface 18 along the fiber 12. This measurement is made using a microscope and the depth of fiber removal is controlled routinely to an accuracy of ±10 micrometers, preferably to within ±2 micrometers. If the radius of fiber curvature is less than about 4 cm, the fiber 12 tends to crack as soon as the lap cuts through the buffer coating or cladding (not shown) which surrounds the fiber 12. Therefore, the preferred radius of curvature for the fiber 12 is determined by the curved surface 16 of the form 10 as 6 cm. After lapping, the flat surface 18 is polished, using ¼-micron particle size polishing compound.

Figure 3:
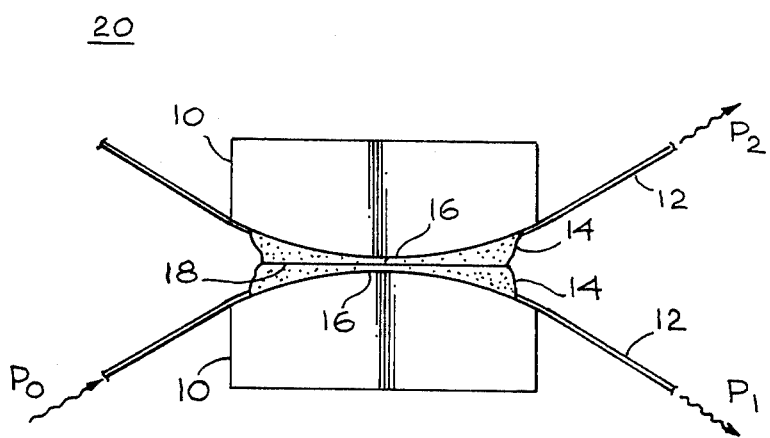
FIG. 3 is a view of two portions such as shown in FIG. 1, joined to form the coupler of the present invention.
Figure 4:
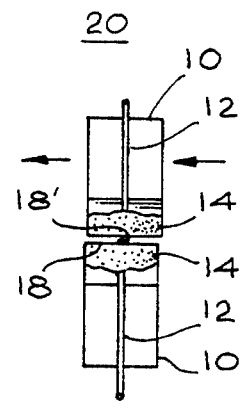
FIG. 4 is an end view of the coupler of FIG. 3 with the spacing exaggerated to illustrate a step in the assembly process.

Two such partial assemblies prepared as described and shown in FIG. 2 are then assembled as shown in FIG. 3 to form a coupler assembly 20. These are preferably identical in construction with the same radii of curvature and the same depth of the lapped and polished planar surfaces. The two portions of the coupler assembly 20 are assembled as shown in FIG. 3 by cementing the planar surfaces 18 together, using optically transparent epoxy. A coarse alignment of the fibers is achieved preliminarily as the operator moves one block (the upper block in FIG. 4) laterally relative to the other block and "feels" the contact between the two exposed fiber flats. Without this physical detection of alignment, made possible by the lapping and polishing procedure described hereinabove, the final alignment would take considerably more time. FIG. 4 shows, in greatly exaggerated form, the fiber flats 18' in relief relative to the planar surfaces 18 with contact being detected as the upper block 10 is moved across the lower block. Before the epoxy hardens, the two portions are finally and precisely aligned by focusing light from a helium-neon laser into one of the ends of a fiber 12 and observing the intensity of light coupled into the opposite fiber. Thus, the laser light may be represented by the energy designated $P_0$ and the coupled light may be represented by the energy designated $P_2$. This coupled intensity $P_2$ is monitored, as with a photodiode and appropriate electronic apparatus (not shown). The transparent epoxy is then cured and the assembly of FIG. 3 is ready for mounting in an enclosure. The coupler is bilateral so that light entering either end of one fiber exits both the other end of that fiber and the associated end of the coupled fiber.

Figure 5:
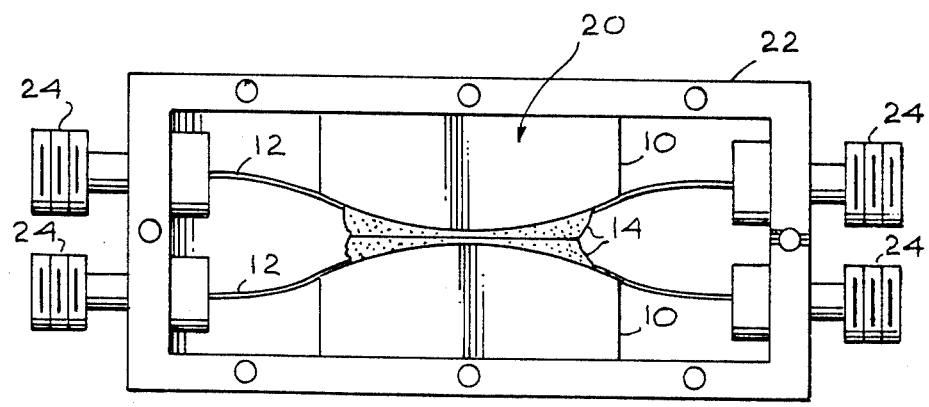
FIG. 5 is a view of a finished device in accordance with the invention.

FIG. 5 illustrates a completed coupler comprising an enclosure 22 in the form of an aluminum box (lid removed) in which the assembly 20 is mounted. Four optical connectors 24 are also supported by the enclosure 22 and are connected respectively to corresponding ends of the fibers 12.

Figure 6:
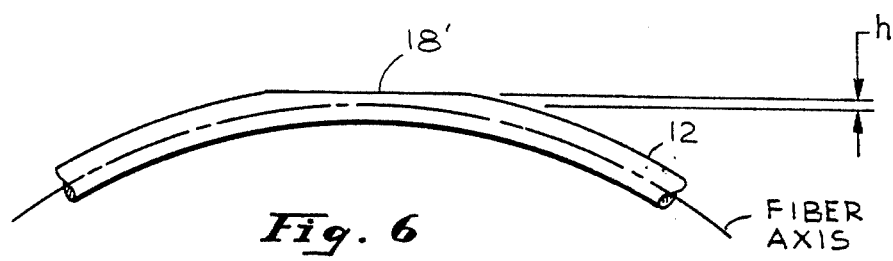
FIG. 6 depicts schematically a portion of an element employed in the present invention.

The performance and operating characteristics of a fiber optic coupler in accordance with the present invention may be further described by reference to FIGS. 6–9. Performance is expressed in terms of the fraction of light coupled to the second fiber and the coupling efficiency or insertion loss. As indicated in FIG. 6, which schematically represents a portion of a fiber 12 lapped to provide a planar surface 18', the dimension h is the distance from the fiber axis to the flat surface 18'. This dimension affects both performance parameters of the fiber optic coupler, i.e. the coupling ratio $\gamma$, expressed in equation (1) as follows:

$$\gamma = 10 \log \frac{P_2}{P_1} \text{ (dB)} \quad (1)$$

and the coupling efficiency $\eta$ which is defined in equation (2) as follows:

$$\eta = 10 \log \frac{P_1 + P_2}{P_o} \text{ (dB)} \quad (2)$$

where the power levels $P_0$, $P_1$ and $P_2$ represent the optical signals depicted in FIG. 3. These two parameters $\gamma$ and $\eta$ vary according to the depth of lapping into the fibers 12 at the center of the curved portions of the fibers, and both parameters may be expressed in terms of the dimension h.

Figure 7:
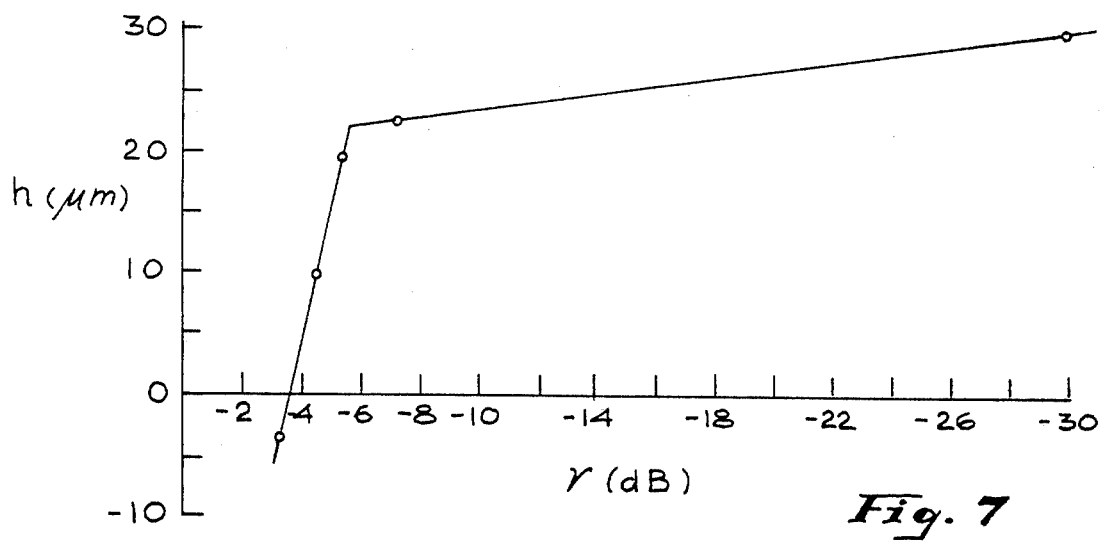
FIGS. 7, 8 and 9 are graphs illustrating the relationship between various parameters of devices in accordance with the present invention.
Figure 8:
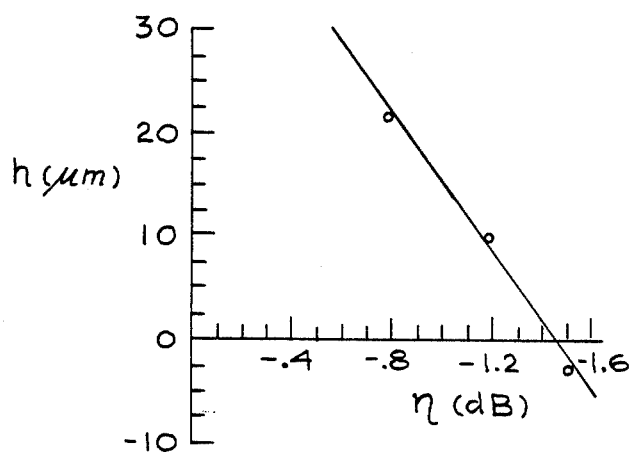

FIGS. 7 and 8 illustrate in graph form the relationships between h on the one hand and $\gamma$ and $\eta$, respectively, on the other hand. FIG. 7 shows that the coupling ratio $\gamma$ has a low value for h greater than the radius of the fiber core. As h approaches the core radius, $\gamma$ increases significantly until h equals zero, at which point one-half the fiber has been removed at the middle of the bend in the fiber. The coupling ratio, shown in FIG. 7, varies from $-3.5$ dB at h equals zero to about $-30$ dB at h equals 30 micrometers, where the edges of the fiber cores are barely in contact (cladding not shown). The coupling efficiency as indicated in FIG. 8 is uniformly high over this range of h ($\eta$ varying from 0.8 dB to 1.5 dB).

Figure 9:
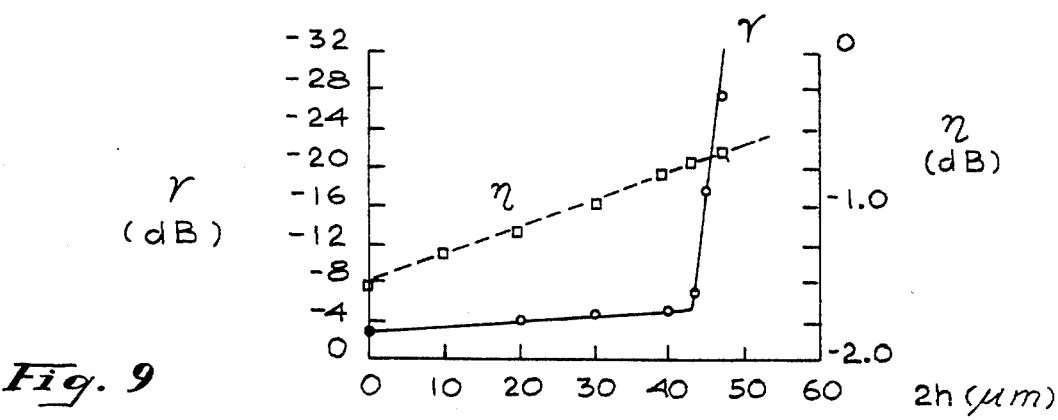

FIG. 9 is another graph showing a dual plot of coupling ratio and efficiency or insertion loss as a function of the depth of glass removed from the fibers. Where h is greater than 30 micrometers (2 h=60 micrometers), the fiber cores are separated by a fraction of the original cladding. Very little coupling is measured when the cores are separated, as is expected due to the short coupling length. When the polished flats extend into the core regions, the coupling ratio increases abruptly, while the insertion loss increases gradually and continuously as the depth of the flat increases.

Particular arrangements in accordance with the present invention provide a fiber optic coupler which is compact, rugged, reproducible and is adaptable by varying the fabrication process in accordance with the teaching of the invention to accommodate specific signal coupling requirements of fiber optic transmission lines. This results in a fiber optic coupler of high efficiency and one which is capable of providing a wide range of coupling ratios to meet specific needs.

Although there have been described above specific arrangements of a fiber optic coupler and method of fabrication thereof in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. The method of fabricating an optical fiber coupler comprising:
   machining a solid form to develop a curved side having a preselected radius of curvature of between 5 and 8 cm;
   applying a coating of liquid epoxy resin on the curved side of the form;
   embedding a portion of an optical fiber in the liquid epoxy resin and allowing the resin to harden, thereby affixing the fiber to the form along the curved side thereof.
   repeating the first, second and third steps with a second solid form and a second optical fiber;
   mounting the two sections thus formed in a lapping and polishing fixture;
   lapping the epoxy and portions of the fibers embedded therein to develop essentially planar surfaces along the epoxy resin and fibers extending to a predetermined depth into the core of each fiber such that each fiber protrudes slightly above the planar surface of the adjacent epoxy;
   polishing the lapped surfaces;
   joining the two lapped and polished sections together at their planar surfaces along a common plane with optically transmitting epoxy;
   preliminarily aligning the fibers by initially moving the two sections parallel to each other along their planar surfaces to detect the protruding fibers contacting each other;
   finally aligning the two sections and the preliminarily aligned fibers thereof by focusing laser light into one of the fiber ends and monitoring the intensity of the light coupled into the other fiber while gradually adjusting the relative positions of the fibers; and
   curing the epoxy joining the two planar surfaces together while maintaining the established alignment thereof.

2. The method of claim 1 further comprising the step of mounting the thus-fabricated assembly in a housing and coupling optical connectors to each of the fiber ends, respectively.

3. The method of claim 1 wherein each form is machined to a radius of curvature of 6 cm.

4. The method of claim 1 wherein each form is machined from an aluminum block.

5. The method of claim 1 wherein the lapping step is performed without removing any of the surface of the previously machined form.

6. The method of claim 5 further including the step of terminatng the lapping prior to contacting the surface of the form.

* * * * *